(12) United States Patent
Gu et al.

(10) Patent No.: US 9,146,910 B2
(45) Date of Patent: Sep. 29, 2015

(54) METHOD AND SYSTEM OF DISPLAYING CROSS-WEBSITE INFORMATION

(75) Inventors: Haijie Gu, Hangzhou (CN); Ningjun Su, Hangzhou (CN); Zhixiong Yang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 29 days.

(21) Appl. No.: 13/498,859

(22) PCT Filed: Dec. 9, 2011

(86) PCT No.: PCT/US2011/064201
§ 371 (c)(1),
(2), (4) Date: Mar. 28, 2012

(87) PCT Pub. No.: WO2012/082561
PCT Pub. Date: Jun. 21, 2012

(65) Prior Publication Data
US 2013/0262979 A1   Oct. 3, 2013

(30) Foreign Application Priority Data

Dec. 14, 2010 (CN) .......................... 2010 1 0588210

(51) Int. Cl.
*G06F 17/21* (2006.01)
*G06F 17/22* (2006.01)
*G06F 17/30* (2006.01)

(52) U.S. Cl.
CPC ...... *G06F 17/2247* (2013.01); *G06F 17/30873* (2013.01)

(58) Field of Classification Search
CPC ................................................. G06F 17/2247
USPC .......................................................... 715/234
See application file for complete search history.

(56) References Cited

U.S. PATENT DOCUMENTS

| 7,072,856 B1 | 7/2006 | Nachom |
| 7,236,950 B2 | 6/2007 | Savage et al. |
| 7,386,485 B1 | 6/2008 | Mussman et al. |

(Continued)

OTHER PUBLICATIONS

The PCT Search Report and Written Opinion mailed May 3, 2012 for PCT application No. PCT/US11/64201, 9 pages.

(Continued)

*Primary Examiner* — James J Debrow
(74) *Attorney, Agent, or Firm* — Lee & Hayes, PLLC

(57) ABSTRACT

The present disclosure discloses a method and a system of displaying cross-website information. The method includes obtaining, by a first server of a first website, product information under a category of at least one desired product of a first user. Next, the first server obtains information of similar product units under a product category of a second server, where a similar product unit includes a set of displayable products. The first server then computes degrees of similarity between the product information under the category of the at least one desired product and respective product information of the similar product units. For the product information under the category of the at least one desired product, the first server selects a predetermined number of top similar product units in a descending order of the degrees of similarity, and renders products included in the predetermined number of top similar product units as products to be displayed. The first server displays the products on a web page of the first website that is viewed by the first user.

20 Claims, 13 Drawing Sheets

(56) References Cited

U.S. PATENT DOCUMENTS

| | | |
|---|---|---|
| 2003/0088559 A1 | 5/2003 | Teranishi |
| 2004/0021682 A1* | 2/2004 | Pryor ............................ 345/709 |
| 2007/0078849 A1 | 4/2007 | Slothouber |
| 2008/0250026 A1* | 10/2008 | Linden et al. .................... 707/10 |
| 2009/0018922 A1 | 1/2009 | Steelberg et al. |
| 2009/0138365 A1* | 5/2009 | Mueller et al. .................. 705/14 |
| 2009/0171754 A1 | 7/2009 | Kane et al. |
| 2009/0172021 A1* | 7/2009 | Kane et al. ................. 707/104.1 |
| 2009/0172551 A1 | 7/2009 | Kane et al. |
| 2009/0222317 A1 | 9/2009 | Allen et al. |
| 2009/0248494 A1* | 10/2009 | Hueter et al. .................... 705/10 |
| 2009/0249229 A1 | 10/2009 | Offer |
| 2010/0058204 A1 | 3/2010 | Wilson |
| 2010/0161400 A1 | 6/2010 | Snodgrass et al. |
| 2011/0010336 A1 | 1/2011 | Johnson et al. |
| 2011/0106796 A1 | 5/2011 | Svaic |
| 2012/0123844 A1* | 5/2012 | Fano et al. .................. 705/14.25 |

OTHER PUBLICATIONS

Russell, "Cross-Sell and Up-Sell", DoveTail Corp., Jul. 2, 2010, retrieved from http://www.dovetailservices.com/downloads/top_tips_xsell.pdf on Apr. 3, 2012, 11 pgs.

Translation of Chinese office action from counterpart Chinese patent application No. 201010588210.9, dated Sep. 30, 2013, 4 pages.

\* cited by examiner

METHOD AND SYSTEM OF DISPLAYING CROSS-WEBSITE INFORMATION

CROSS REFERENCE TO RELATED PATENT APPLICATIONS

This application is a national stage application of an international patent application PCT/US11/64201, filed Dec. 9, 2011, which claims priority to Chinese Patent Application No. 201010588210.9, filed on Dec. 14, 2010, entitled "METHOD AND SYSTEM OF DISPLAYING INFORMATION ACROSS WEBSITES," which applications are hereby incorporated by reference in their entirety.

TECHNICAL FIELD

The present disclosure relates to the field of Internet data processing, and particularly, relates to methods and systems of displaying cross-website information.

BACKGROUND

With the development of Internet technology, the Internet has become an important means for network users to obtain information and resources. Under normal circumstances, a network user usually surfs one or more favorite websites (e.g., website A) and rarely visits other websites (e.g., website B). As a result, the website A includes records of activity data (e.g., searching, browsing, collecting and purchasing information of the website A) associated with the network user while website B does not include any record of activity data associated with this network user.

An example is an e-commerce website. E-commerce websites may be divided into three categories based on customer groups that are primarily served: B2B (business to business) type e-commerce websites, of which parties of transactions are both businesses; B2C (business to customer) type e-commerce websites, through which businesses provide online purchase services to individual customers; and C2C (customer to customer) type e-commerce websites, of which buying users are normally individual customers and selling users are primarily individuals with some being small-scale businesses. Under normal circumstances, these three types of e-commerce websites are operated by different network operators, and therefore are mutually independent of one another. Data of these websites is also independent of one another.

When a user of the website A browses a product, products that may be of interest to the user and products that are related to the currently browsed product are recommended and displayed to the user on a web page thereof to shorten a search path of products desired by the user and improve an efficiency of online shopping of the user on the website A. Existing Internet e-commerce websites mostly adopt intelligent recommendation systems to allow a user to see popular products on a web page thereof upon login, and obtain information of other products that are related to products purchased by the user.

Two methods of implementing main operations of the intelligent recommendation systems exist. One is to present products to a user of a website based on specific activity records of the user. Specifically, this method includes: recording, by the website, historical activities such as searching, browsing, collecting or purchasing of a product done by a certain user, and determining needs and product preferences of the user based on these historical activities using a predetermined algorithm, i.e., presenting relevant product information to the user according to the user's attention with respect to certain products that is reflected by the past activities of the user. Alternatively, relevant products corresponding to products that are currently drawing a great deal of attention are presented to the user based on characteristics of group activities associated with multiple users. Alternatively, products which have drawn attention from many similar user groups are presented to related users to perform targeted presentation of products for users of those groups.

Another implementation method used by existing intelligent recommendation systems includes: displaying, on a web page currently viewed by a user, products that have high click rates, high transaction volumes or high quality based on businesses that have been registered by and are of interest to the user or businesses that have been clicked relatively frequently by the user. This resolves to a certain extent the failure of a new user or a user having limited activity data to obtain further product information.

Nevertheless, no matter which implementation method is adopted by an existing recommendation system, displaying is basically conducted from within a website. Specifically, a server of the website displays products that are included in that website to registered users of that website. However, the registered users of that website desire not only products of that website but also products of other websites. Consider a user of a C2C website as an example. When the user of the C2C website needs to obtain information of a desired product from a B2B website, the user of the C2C website is required to further login or register at the B2B website to obtain the information of the desired product. User registration of a website not only takes up time, but also increases number of interactions between servers and affects efficiency of displaying products to other users due to frequent logins to the website. These problems inevitably lead to frequent or redundant responses of the servers to user requests, resulting in further reduction in processing speed and processing performance of the servers.

In short, a technical problem that is urgently needed to be resolved by one skilled in the art is how to provide an innovative method of displaying cross-website information in order to solve the problem of reduction in processing speed and processing performance of servers with respect to efficiency of displaying products when the products are displayed in existing technologies.

SUMMARY

Accordingly, the present disclosure provides a method and a system of displaying information across websites that can solve the problems of reduction in processing speed and processing performance of servers with respect to efficiency of displaying products when the products are displayed in existing technologies.

In order to achieve the aforementioned goals, the present disclosure provides the following technical scheme.

In one embodiment, a method of displaying cross-website information includes obtaining, by a first server of a first website, product information under a category of at least one desired product of a first user. The first server may further obtain information of similar product units under a product category of a second server. In one embodiment, a similar product unit includes a set of displayable products. The first server may compute degrees of similarity between the product information under the category of the at least one desired product and respective product information of the similar product units. For the product information under the category of the at least one desired product, the first server may select a predetermined number of top similar product units in a descending order of the degrees of similarity, and render products included in the predetermined number of top similar product units as products to be displayed. Additionally, the first server may display the products to be displayed on a web page of the first website that is viewed by the first user.

In another embodiment, a method of displaying cross-website information may include obtaining, by a first server of a first website, product information under a category of at least one desired product of a first user, and sending the product information under the category of the at least one desired product to a second server. Additionally the first server may receive products to be displayed sent from the second server to facilitate displaying the products to be displayed on a web page of the first website that is viewed by the first user. In one embodiment, the second server may obtain the products to be displayed by computing degrees of similarity between the product information under the category of the at least one desired product and respective product information of all similar product units under each product category. A similar product unit may include a set of displayable products. Furthermore, for the product information under the category of the at least one desired product, the second server may select a predetermined number of top similar product units in a descending order of the degrees of similarity, and render products included in the predetermined number of top similar product units as the products to be displayed.

In some embodiments, a system of displaying cross-website information may include an acquisition unit, a computation unit, a selection unit and a display unit in a first server, and a creation unit in a second server.

The acquisition unit is configured to obtain product information under a category of at least one desired product of the first user of a first server, and information of similar product units under a product category of the second server, where a similar product unit includes a set of displayable products.

The creation unit is configured to create all similar product units under each product category of the second server.

The computation unit is configured to compute degrees of similarity between the product information under the category of the at least one desired product and respective product information of the similar product units.

The selection unit is configured to, for the product information under the category of the at least one desired product, select a predetermined number of top similar product units in a descending order of the degrees of similarity, and render products included in the predetermined number of top similar product units as products to be displayed.

The display unit is configured to display the products to be displayed on a web page of the first website that is viewed by the first user.

In other embodiments, a system of displaying cross-website information, may include an acquisition unit, a first sending unit, and a display unit in a first server, and a computation unit, a selection unit and a second sending unit in a second server.

The acquisition unit is configured to obtain product information under a category of at least one desired product of a first user.

The first sending unit is configured to send the product information under the category of the at least one desired product to the computation unit.

The computation unit is configured to compute degrees of similarity between the product information under the category of the at least one desired product and respective product information of all similar product units under each product category of the second server, where a similar product unit includes a set of displayable products.

The selection unit is configured to, for the product information under the category of the at least one desired product, select a predetermined number of top similar product units in a descending order of the degrees of similarity, and rendering products included in the predetermined number of top similar product units as products to be displayed.

The second sending unit is configured to send the products to be displayed to the display unit to facilitate the display unit to display the products to be displayed on a web page of the first website that is viewed by the first user.

From the above technical schemes and comparisons with existing technologies, the present disclosure provides a method of displaying cross-website information by matching product information of a category of a product desired by a first user of a first website with product information of similar product units of a second website, obtaining products to be displayed based on degrees of similarity therebetween, and displaying the products to be displayed to a customer of a seller of the first website. Therefore, the customer of the seller of the first website can obtain product information of the second website on time, thus realizing displaying product information across websites. Displaying product information across websites releases the first user of the first website from requiring to register or login the second website, and allows the first server and the second server to process registration or login requests of other users more efficiently, thus improving efficiency of the servers. Furthermore, a user can obtain product information of the second website on the first website and hence can obtain desired products more quickly. Specifically, the efficiency of the server of the first website to process a user request for desired product information is improved.

Another method of displaying cross-website information that is provided by the present disclosure not only realizes displaying product information across websites and improves processing performance of servers, but also reduces amount of data transmission between a first server and a second server and improves the speed of network data transmission, thereby saving transmission resources of the servers while improving the efficiency of the first server in processing user requests. Evidently, any product implementing the present disclosure is not required to achieve all the above advantages at one time.

BRIEF DESCRIPTION OF THE DRAWINGS

In order to more clearly understand the technical scheme of the exemplary embodiments of the present disclosure or existing technologies, accompanying figures that are needed for the description of the exemplary embodiments or existing technologies are briefly introduced below. Understandably, the following figures only constitute a few exemplary embodiments of the present disclosure. Based on these accompanying figures, one of ordinary skills in the art can obtain other figures without making any creative effort.

DETAILED DESCRIPTION

The technical scheme in the exemplary embodiments of the present disclosure will be described clearly and completely below using the accompanying figures in the exemplary embodiments. Understandably, the exemplary embodiments described herein only constitute parts, but not all, of exemplary embodiments of the present disclosure. Based on the exemplary embodiments of the present disclosure, one skilled in the art can obtain all other exemplary embodiments, which are still within the scope of the present disclosure.

The disclosed method and system may be used in an environment or in a configuration of universal or specialized computing apparatus(es). Examples include a personal computer, a server computer, a handheld device or a portable device, a tablet device, a multi-processor system, and a distributed computing environment including any apparatus or device above.

The disclosed method and system can be described in the general context of computer-executable instructions, e.g., program modules. Generally, the program modules can include routines, programs, objects, components, data structures, and the like that perform particular functions or implement particular abstract data types. The disclosed method and system can also be practiced in a distributed computing environment where functions are performed by remote processing devices that are linked through a communication network. In a distributed computing environment, the program modules may be located in local and/or remote computer storage media, including memory storage devices.

One of the main concepts of the present disclosure may include as follows. First, a first server of a first website obtains product information under a category of a desired product of a registered user. The product information may be of one piece or multiple pieces. A second server of a second website then creates similar product units based on information of products that have been involved in transactions on the second website. A similar product unit includes a set of displayable products. Thereafter, based on degrees of similarity between products of the first website and product information of the similar product units of the second website, the first server obtains product within similar product units that have higher degrees of similarity, and displays those products on a web page of the first website, thus realizing a functionality of displaying products of the second website on the first website. This facilitates users who browse products on the first website to obtain product information of the second website without logging into the second website or the second server. The number of interactions between the users and the servers is thereby reduced, thus further improving performance of the servers.

Figure 1:
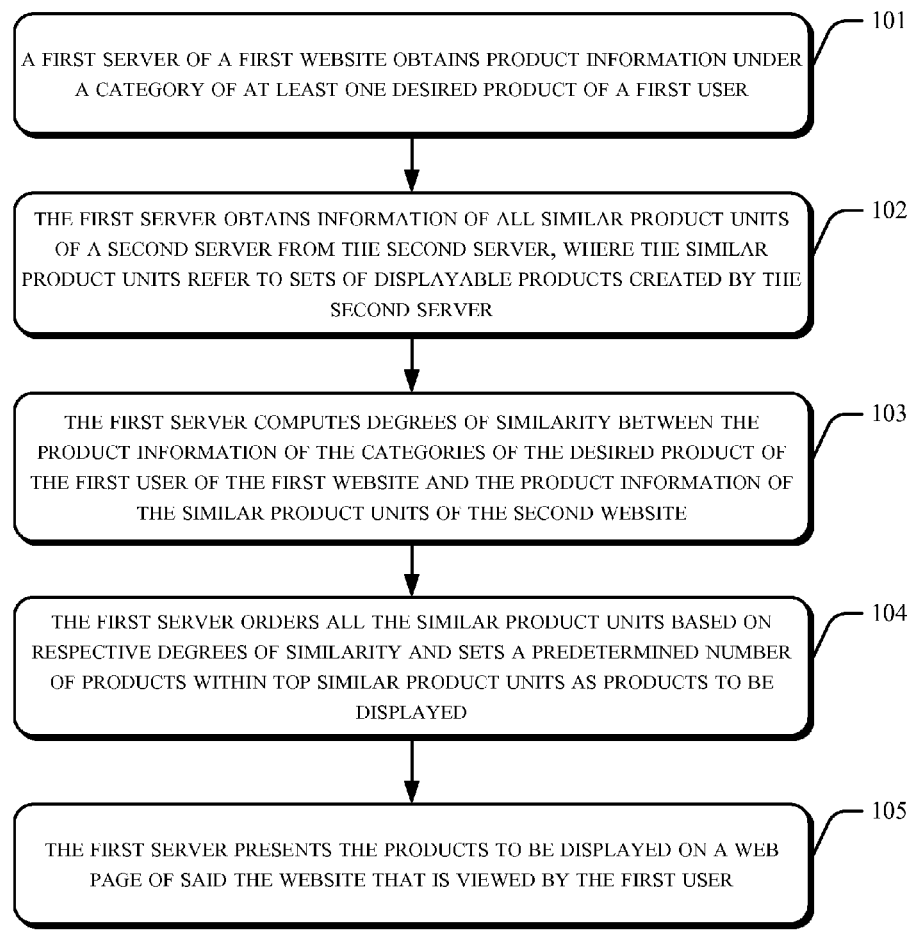
FIG. 1 shows a flow chart illustrating a first exemplary method of displaying cross-website information.

FIG. 1 shows a flow chart illustrating a first exemplary method of displaying cross-website information. A technical scheme provided in this exemplary method includes the following blocks.

At block 101, a first server of a first website obtains product information under a category of at least one desired product of a first user.

The first website may be any C2C website, B2B website or other website. The first server is a server corresponding to the first website. It should be noted that, in practical implementations, the present disclosure can be applied not only to shopping websites of online trading platforms, but also to common video websites, forum websites, etc. In that case, the product desired by the user may be certain segment(s) of video content, or a certain post, etc. A user-desired product will vary as a website implementing the present disclosure is varied.

In this embodiment, a C2C website is used as an example of the first website. The first user of the first website is a user who has registered in the C2C website and can conduct product transactions in the first website. As a C2C website is a customer-to-customer e-commerce website, product information obtained from this C2C website is unable to satisfy a request of the user for product information if this registered user desires a relatively large number of products. In practical applications, the first user is required to obtain product information from a second website (which is any website different from the first website, such as a C2C website or a B2B website). What is implemented at this block is that the first server obtains the product information under the category of the desired product of the first user. The desired product may belong to a single category or multiple categories. After registration in the first website, the first user publishes a certain number of products for other users to purchase or store. The product information of the first user corresponds to the product information that is published by the first user when acting as a selling user.

As the product information of the first user of the first website is stored in a database of the first server, the first server performs the act of obtaining the product information of the category desired by the first user of the first website.

Figure 2:
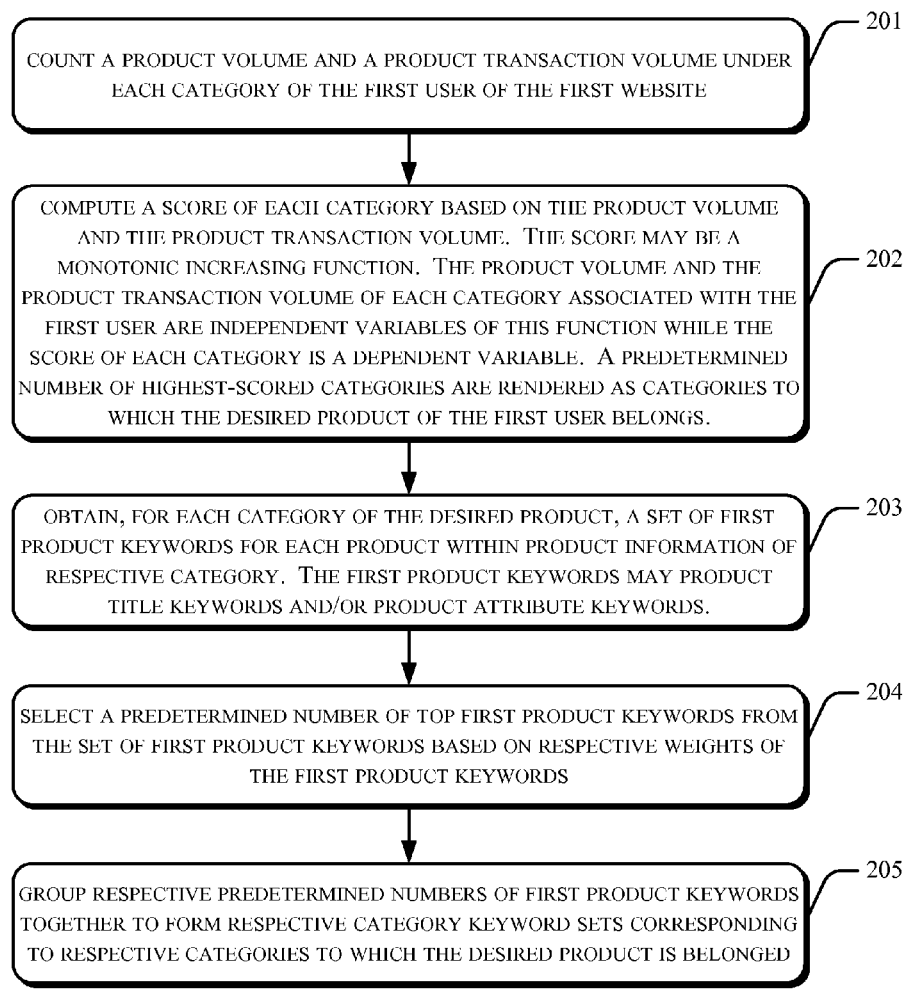
FIG. 2 shows a flow chart illustrating one implementation of the operation defined in block 101 of the first exemplary method.

Referring to FIG. 2, a specific implementation of block 101 may include the following blocks.

Block 201 counts a product volume and a product transaction volume under each category of the first user of the first website.

First, the first server counts a total product volume and a total product transaction volume under each category of the first user of the first website. Each category may be considered as a different category to which product information published by the user belongs. The product volume represents the total number of products associated with the first user that are currently available for transactions. The product transaction volume represents the number of products that have been involved in completed transactions of the first user.

It should be noted that each user has a unique identification which may be a user name or a string obtained upon applying an encryption algorithm to the user name, for example. This can ensure that the first server can treat a user as a unit when counting a product volume and a product transaction volume.

Block 202 computes a score of each category based on the product volume and the product transaction volume. The score may be a monotonic increasing function. The product volume and the product transaction volume of each category associated with the first user are independent variables of this function while the score of each category is a dependent variable. A predetermined number of highest-scored categories are rendered as categories to which the desired product of the first user belongs.

The first server sets up a monotonic increasing function, and uses the product volume and the product transaction volume under each category associated with the first user as independent variables of the function, with the score of each category being a dependent variable. The first server then employs this monotonic increasing function to compute the score of each category. It should be noted that there is no limitation on a specific form of this monotonic increasing function, so long as the product volume and the product transaction volume are used to compute a score of a category. However, this monotonic increasing function needs to meet the following criteria: the greater the transaction volume of a product is, the higher the score of a category associated with the product will be, and the more the number of products a certain category includes, the higher a score of that category will be.

The categories associated with the first user may be ordered according to respective scores. A predetermined number of top-scored categories may be rendered as categories to which the desired product of the first user belongs. For example, the first three top-scored categories are rendered as category information of the desired product of the first user.

Block 203 obtains, for each category of the desired product, a set of first product keywords for each product within product information of respective category. The first product keywords may product title keywords and/or product attribute keywords.

Upon obtaining the categories of the desired product, product information under each category of the desired product is further analyzed. A group of keywords are used to depict main information of a product under each category, i.e., a set of first product keywords. Specifically, in response to determining the categories of the desired product of the first user, title keywords and attribute keywords associated with information of each product are first extracted. The method of extracting the keywords may adopt any existing method used for keyword extraction. Accordingly, the present exemplary embodiment does not have any limitations on the method of extracting keywords.

Block 204 selects a predetermined number of top first product keywords from the set of first product keywords based on respective weights of the first product keywords.

In response to obtaining the title keywords and the attribute keywords, each title keyword or attribute keyword is set as a monotonic increasing function of a transaction volume of associated product. A value obtained from the monotonic increasing function is referred to as a weight for the title keyword or the attribute keyword. When a title keyword or an attribute keyword appears in a number of products, respective weight increases accordingly. A total weight of each title keyword or attribute keyword is obtained at the end. These title keywords or attribute keywords are arranged in a descending order of respective weights, and a certain number of highest-weighted keywords are selected to be first product keywords (for example, selecting the first ten keywords). This monotonic increasing function need to fulfill a requirement that the more frequently a title keyword or an attribute keyword appears among products, the greater its respective weight will be. At this block, a weight of a product keyword may alternatively be rendered as a monotonic increasing function of a transaction volume of associated product. Therefore, respective weights of product keywords of all products under categories desired by the first user may be computed from transaction volumes of each product.

Block 205 groups respective predetermined numbers of first product keywords together to form respective category keyword sets corresponding to respective categories to which the desired product is belonged.

Based on a computation result at block 204, each category to which the desired product of the first user belongs includes ten category keywords. At this block, these ten category keywords are needed to form a category keyword set. This category keyword set may describe product information of a category. Product information of a category of the desired product of the first user forms a category keyword set. No specific ordering relationship may be required for category keywords in the category keyword set. It can be understood that this blocks actually corresponds all category keywords of a category to the category, i.e., establishing a correspondence relationship between a certain category and all category keywords thereof.

It should be noted that, in practical applications, this category keyword set may depict characteristics of products under associated category of the first user that is available for transaction. Further, as this category keyword set is computed and obtained based on specific tradable products and the product transaction volume of the first user, the category keyword set depicts personalized stock demands of the first user.

With reference again to FIG. 1, at block 102, the first server obtains information of all similar product units of a second server from the second server. The similar product units refer to sets of displayable products created by the second server.

The second website may be any C2C website, B2B website or other website. The second server is a server corresponding to the second website. Similar to the first website, the second website can be any website such as a common video website, a forum website, etc., and a product desired by the user may be segment(s) of video content, or a certain post, etc. A user-desired product will vary as a website implementing the present disclosure is varied. In this embodiment, a B2B website is used as an example of the second website. The first server and the second server are two servers having the same functionalities. Product information associated with the second website is stored in a database of the second server. Therefore, creation of similar product units is performed by the second server.

With a view to obtain relevant product information from the second website and displaying the relevant product information on a web page of the first website browsed by the first user of the first website, the first server needs to find product information which satisfies needs of the first user of the first website from among all displayable products of the second website. As the product information of the second website is stored in the database of the second server, the second server is needed to first categorize all displayable products of the second website and divide all products into different sets. Products in each group possess same or similar characteristics. Such categorization process is referred to as creation of similar product units by the second server.

A similar product unit (spu) is a set of multiple similar products. Products in a similar product unit possess same or similar characteristics, e.g., same or similar style, materials of the products, etc. To be similar indicates that a difference between products in terms of size or materials, for example, is within a predetermined range. A specific value for a predetermined range of the difference can be specifically determined by one skilled in the art.

Figure 3:
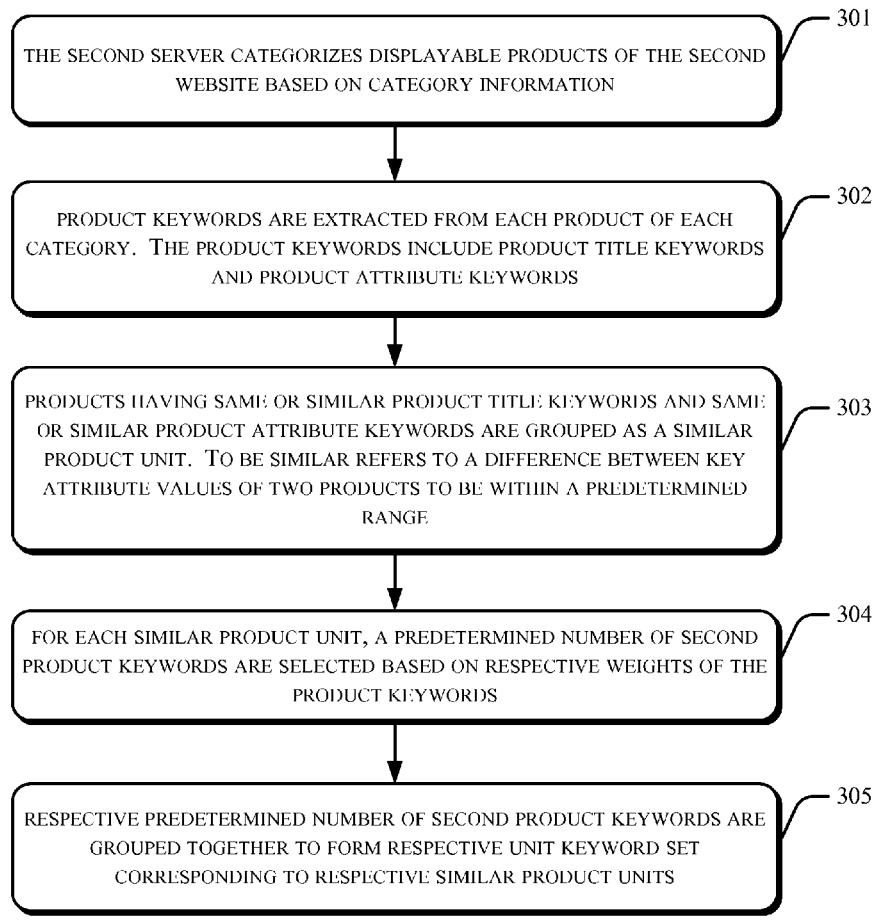
FIG. 3 shows a flow chart illustrating one implementation of the operation defined in block 102 of the first exemplary method.

As shown in FIG. 3, details of an execution process of block 102 include the following blocks.

At block 301, the second server categorizes displayable products of the second website based on category information.

At this block, all displayable products in the second website are categorized based on conventional product category standard to obtain multiple product categories.

At block 302, product keywords are extracted from each product of each category. The product keywords include product title keywords and product attribute keywords.

Product keywords are extracted from each product of each category using a conventional method. Specifically, the product keywords may include product title keywords and product attribute keywords, i.e., relevant keywords that are extracted from titles and attributes of respective products. An attribute of a product corresponds to a type, a style, a specification or materials, etc.

At block 303, products having same or similar product title keywords and same or similar product attribute keywords are grouped as a similar product unit. To be similar refers to a difference between key attribute values of two products to be within a predetermined range.

Upon extracting the product title keywords and the product attribute keywords, products having same or similar product title keywords and same or similar key attribute keywords can be grouped into a similar product unit. The meaning of being similar is that a difference between key attribute values represented by key attribute keywords of two products is within a predetermined range, or title keywords of two products are partially the same. As can be seen, products within a similar product unit are a set of products under a same category.

At block 304, for each similar product unit, a predetermined number of second product keywords are selected based on respective weights of the product keywords.

For each similar product unit, the second server further extracts at least one unit keyword from product information of respective similar product unit. Specifically, a method of extracting unit keyword(s) may include: computing weights of the product keywords (including title content keywords and key attribute keywords, for example) of each piece of product information. A weight of a product keyword corresponds to a monotonic increasing function of a frequency of occurrence of the keyword in associated similar product unit. Specifically, the more frequently a keyword appears, the greater the weight of the keyword will be. Upon obtaining weights of the keywords, a predetermined number of second product keywords are selected based on respective weights of the product keywords. For example, the first ten keywords are selected to be second product keywords.

At block 305, respective predetermined number of second product keywords are grouped together to form respective unit keyword set corresponding to respective similar product units.

Finally, the second server group ten second product keywords corresponding to each similar product unit into a unit keyword set. The unit keyword unit may describe product information of respective similar product unit. Specifically, the product information of a similar product unit can be grouped together to form a unit keyword set.

After block 305, the second server has created similar product units. The first server may then obtain information of all similar product units of the second server. The information of the similar product units correspond to the unit keyword sets which correspond to the similar product units respectively.

After the second server has created the similar product units, the first server sends a request to the second server for obtaining the information of the similar product units. The information of the similar product units includes the unit keyword sets of the similar product units. Upon receiving the request, the second server may send the information of the similar product units to the first server.

Returning to FIG. 1, at block 103, the first server computes degrees of similarity between the product information of the categories of the desired product of the first user of the first website and the product information of the similar product units of the second website.

Computation of the degrees of similarity between the product information of the categories of the desired product of the first user and the product information of the similar product units may be completed by the first server or the second server, and in the technical scheme of this embodiment, is completed by the first server.

Specifically, in practical applications, a degree of similarity between a category keyword set and a unit keyword set may be computed using a set similarity equation. A degree of similarity between a category keyword set and a unit keyword set represents a degree of similarity between product information of a category to which a desired product belongs and product information of a similar product unit. Specifically, a process of computing a degree of similarity may use a set similarity equation such as cosine similarity, Jaccard coefficient, etc., for computation.

At block 104, the first server orders all the similar product units based on respective degrees of similarity and sets a predetermined number of products within top similar product units as products to be displayed.

Upon computing the degrees of similarity between the category keyword set and the unit keyword sets, the first server orders all the similar product units based on respective degrees of similarity, and sets a predetermined number of products within top similar product units as products to be displayed. Specifically, the ordered similar product units may be cumulated, starting from the first one. For example, products of the top two similar product units are first cumulated until a cumulative number of products reach a predetermined threshold. And upon reaching one hundred products, for example, these one hundred products are set as products to be displayed.

At block 105, the first server presents the products to be displayed on a web page of said the website that is viewed by the first user.

Upon obtaining the products to be displayed that need to be displayed on the first website, the first server presents the products to be displayed to the first user on a webpage of the first website that is viewed by the first user.

Figure 4:
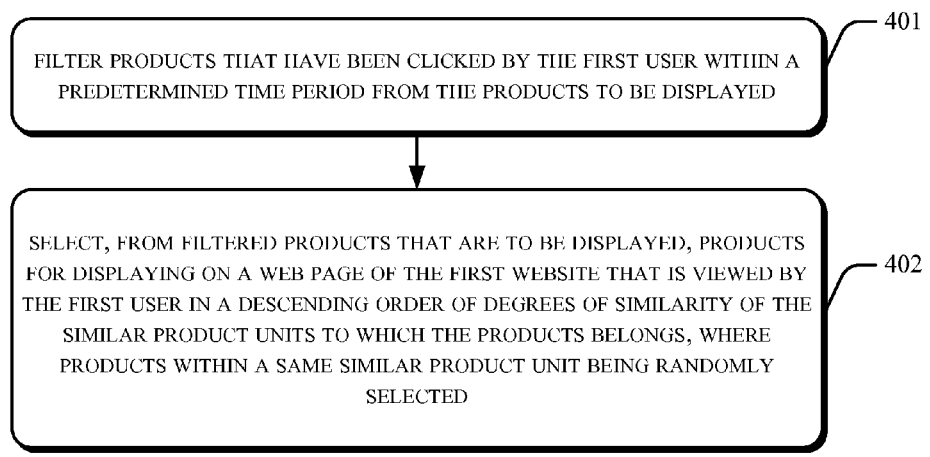
FIG. 4 shows a flow chart illustrating one implementation of the operation defined in block 105 of the first exemplary method.

As shown in FIG. 4, details of an execution process of block 105 may include the following blocks.

Block 401 filters products that have been clicked by the first user within a predetermined time period from the products to be displayed.

There is no limitation on the value of the predetermined time period, which may be in a unit of hours or days. The server may obtain click information of the first user on a same product, and may therefore determine whether the user has clicked the product within the predetermined time period. If clicked, the product is removed from the products to be displayed, thus preventing certain products from being displayed too frequently and affecting other products that have not been displayed.

Block 402 selects, from filtered products that are to be displayed, products for displaying on a web page of the first website that is viewed by the first user in a descending order of degrees of similarity of the similar product units to which the products belongs, where products within a same similar product unit being randomly selected.

At this block, the first server selects products within the similar product units for displaying on a web page of the first website that is viewed by the first user based on values of degrees of similarity, with products of a same similar product unit being selected randomly for display. It should be noted that, when implementing the present disclosure, the task of computing degrees of similarity may alternatively be completed by the second server. Under that situation, the second server first obtains product information of a category desired by the first user from the first server, computes degrees of similarity, and upon obtaining the products to be displayed, sends information of the products to be displayed to the first server which displays the products to be displayed on the first website.

Therefore, the first server and the second server are equivalent servers. Operations which can be completed by the first server and the second server respectively are not limited to those described in the first exemplary embodiment. One skilled in the art can specify details about distribution of work between the first server and the second server based on the technical concepts provided in the present disclosure.

The technical scheme provided in the present disclosure allows product information of a second website to be displayed on a web page of a first website, and hence allows the first user of the first website to obtain the product information of the second website without registering at or logging into the second website. Therefore, the server of the second website can process registration or login requests from other users more efficiently, while the first website can display more relevant product information of a product category desired by the first user to the first user, thereby improving efficiency of the first website in processing a request of the first user for product information. Hence, this exemplary embodiment can improve processing speed and processing performance of the servers as the number of responses of the servers to user's requests is reduced.

Figure 5:
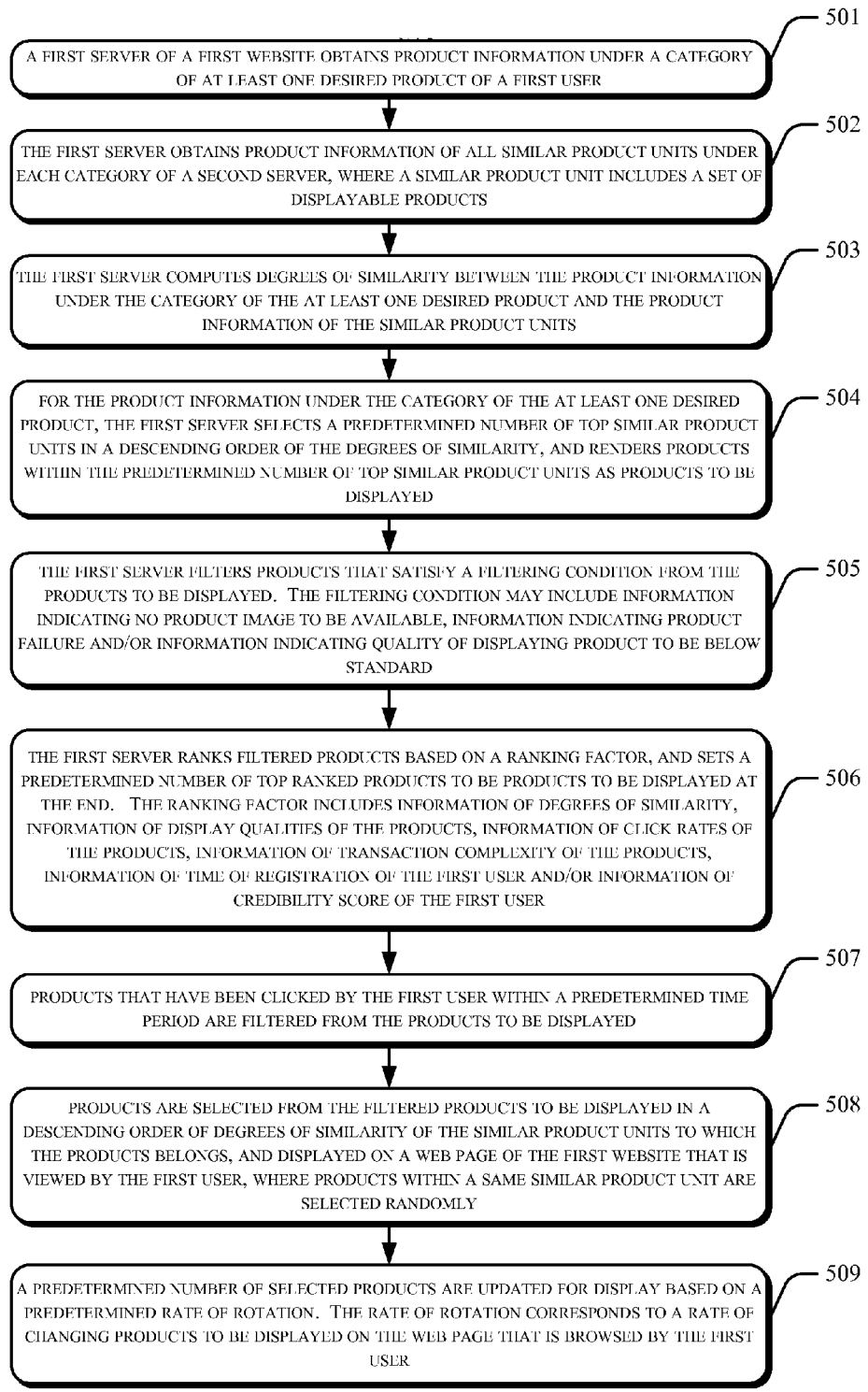
FIG. 5 shows a flow chart illustrating a second exemplary method of displaying across-website information.

FIG. 5 shows a flow chart illustrating a second exemplary method of displaying cross-website information. A technical scheme provided in this exemplary embodiment includes the following blocks.

At block 501, a first server of a first website obtains product information under a category of at least one desired product of a first user.

In this embodiment, a C2C website is used as an example of the first website is and the second website is a B2B website, for example.

Specific operations of a process at this block may be referenced to block 101 and are not redundantly described herein.

At block 502, the first server obtains product information of all similar product units under each category of a second server, where a similar product unit includes a set of displayable products.

The second server categorizes all displayable products of the second website and divides all the products into similar product units. The first server then obtains information of all the similar product units from the second server.

At block 503, the first server computes degrees of similarity between the product information under the category of the at least one desired product and the product information of the similar product units.

At block 504, for the product information under the category of the at least one desired product, the first server selects a predetermined number of top similar product units in a descending order of the degrees of similarity, and renders products within the predetermined number of top similar product units as products to be displayed.

At block 505, the first server filters products that satisfy a filtering condition from the products to be displayed. The filtering condition may include information indicating no product image to be available, information indicating product failure and/or information indicating quality of displaying product to be below standard.

Specifically, the filtering condition may include information indicating no product image to be available, information indicating product failure and/or information indicating quality of displaying product to be below standard. Specifically, if any one of these three conditions—information indicating no product image to be available, product failure and/or quality of displaying product to be below standard, associated product is filtered out and will not be displayed.

At block 506, the first server ranks filtered products based on a ranking factor, and sets a predetermined number of top ranked products to be products to be displayed at the end. The ranking factor includes information of degrees of similarity, information of display qualities of the products, information of click rates of the products, information of transaction complexity of the products, information of time of registration of the first user and/or information of credibility score of the first user.

This exemplary method further includes a process of ranking the filtered products based on a ranking factor. Specifically, the ranking factor includes a degree of similarity, between a similar product unit to which a product belongs and product information of a category desired by the first user of the first website, information of display quality of the product, click rate of the product, information of transaction complexity of the product, information of time of registration of the user having the product and/or a credibility score of the user having the product. The information of display quality of the product refers to as a signal quality of displaying the product on the web page.

It should be noted that a ranking of a product is proportional to the number of ranking factors that the product possesses or respective weights associated with the ranking factors that the product possesses. A weight associated with a ranking factor may be obtained by creating regression and category models. Weights associated with ranking factors of different products may be different.

Through filtering and ranking at blocks 505 and 506, a set of high-quality products to be displayed may be selected from the original set of products to be displayed. Specifically, product information that satisfies needs of the first user in a better way is selected.

At block 507, products that have been clicked by the first user within a predetermined time period are filtered from the products to be displayed.

When presenting products to the first user, products that have been seen by the user do not need to be displayed again. Therefore, products that have been viewed by the user in a certain time period need to be filtered. This time period may be set to be three days or one week, or may be set by one skilled in the art based on an average access rate of the website users.

At block 508, products are selected from the filtered products to be displayed in a descending order of degrees of similarity of the similar product units to which the products belongs, and displayed on a web page of the first website that is viewed by the first user, where products within a same similar product unit are selected randomly.

At block 509, a predetermined number of selected products are updated for display based on a predetermined rate of rotation. The rate of rotation corresponds to a rate of changing products to be displayed on the web page that is browsed by the first user.

The rate of rotation corresponds to a rate of changing products to be displayed on the web page browsed by the first user. In general, a rotation time is set as a time period which allows a user to read products on a page slowly, for example, half an hour. The rate of rotation is a reciprocal of the rotation time. The rate of rotation and the predetermined number may be determined by one skilled in the art based on specific needs, and are not limited in the present disclosure.

This exemplary embodiment eliminates unqualified products when selecting products for display from a set of products to be displayed. Displaying these unqualified products on the web page of the first website may affect display of other products by the server and causes the first user to fail to obtain desired product information more quickly. Therefore, the technical scheme provided in the present disclosure further improves efficiency of the first server in processing a request of the first user for product information and allows product information of the second website to be displayed on a web page of the first website so that the first user of the first website can obtain the product information of the second website without registering or logging into the second website. Further, the server of the second website can process registration or login requests from other users more efficiently. Moreover, the first user of the first website can obtain product information that satisfies his/her needs more quickly, and thus the efficiency of the first server in processing the request for product information from the first user is improved.

Figure 6:
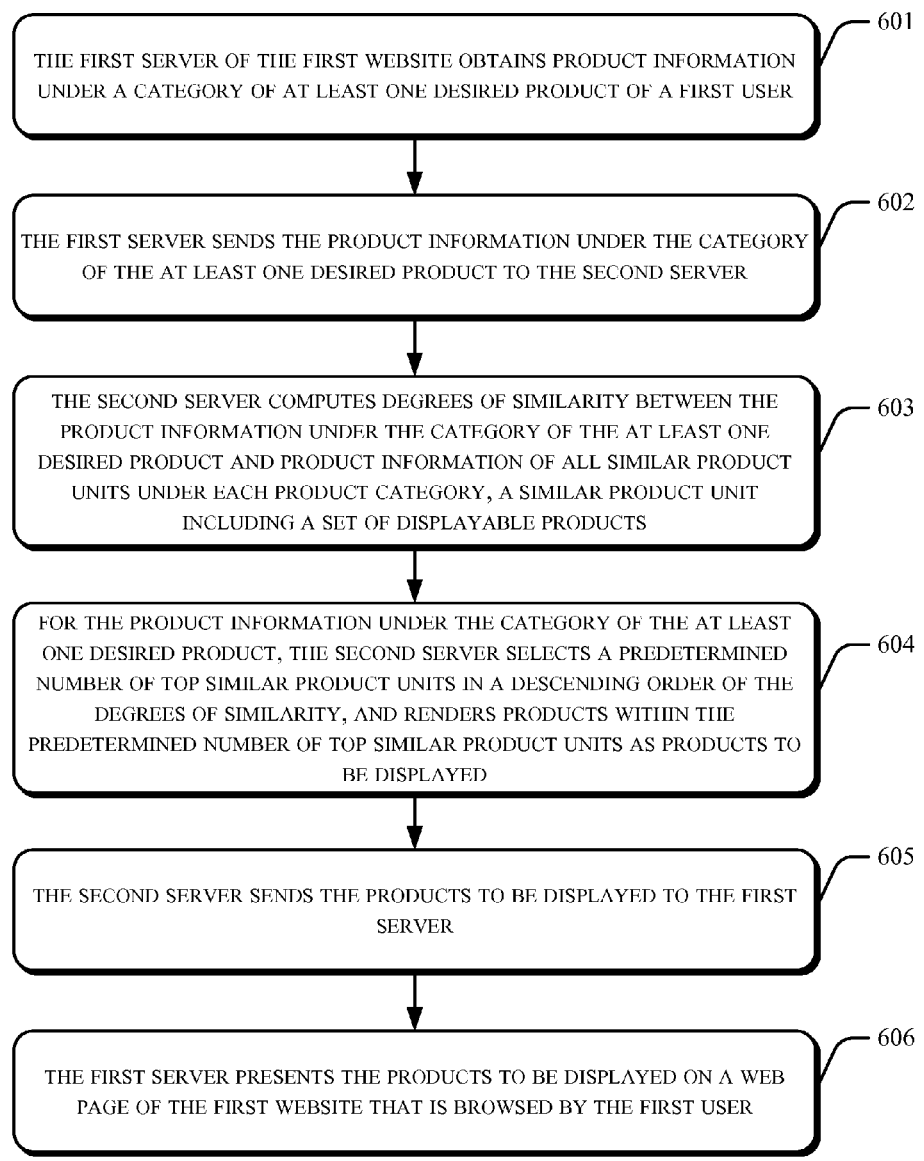
FIG. 6 shows a flow chart illustrating a third exemplary method of displaying across-website information.

FIG. 6 shows a flow chart illustrating a third exemplary method of displaying cross-website information. A difference of the third embodiment from the first and the second embodiments is that degrees of similarity are computed by the second server. A technical scheme provided in this exemplary embodiment includes the following blocks.

At block 601, the first server of the first website obtains product information under a category of at least one desired product of a first user.

In practical application, an implementation process at this block can be referenced to those described in the first embodiment and are not redundantly described herein.

At block 602, the first server sends the product information under the category of the at least one desired product to the second server.

In this embodiment, upon obtaining the product information under the category of the desired product of the user, the first server sends one or more categories and respective product information to the second server so that the second server can compute degrees of similarity based on the received product information accordingly.

At block 603, the second server computes degrees of similarity between the product information under the category of the at least one desired product and product information of all similar product units under each product category. A similar product unit includes a set of displayable products.

The second sever needs to create similar product units based on all product information that is stored in a database in advance. The similar product unit includes a set of displayable products. A process of implementing creation of similar product units by the second server can be referenced to those described at block 102 of the first embodiment.

The second server needs to compute degrees of similarity between the product information of the first server and the product information of the second server based on the received product information under the category of the desired product and the product information within all the similar product units under each product category created by the second server. It should be noted that a process of implementing computation of the degrees of similarity is consistent with those described at block 103, and the only difference is that the second server is the entity to perform such computation in this embodiment.

At block 604: for the product information under the category of the at least one desired product, the second server selects a predetermined number of top similar product units in a descending order of the degrees of similarity, and renders products within the predetermined number of top similar product units as products to be displayed.

In this embodiment, upon obtaining the degrees of similarity, the second server selects a predetermined number of top similar product units in a descending order of the degrees of similarity and renders products within these similar product units as the products to be displayed. Since the database of the second server stores all product information, the number of products included in all the similar product units is tremendous. At this block, the second server filters this product information in advance, i.e., rendering those products of the second server having high degrees of similarity with the category of the first desired product as products to be displayed. Accordingly, not all the product information in the database needs to be sent to the first server, thus greatly reducing data transmission volume.

At block 605, the second server sends the products to be displayed to the first server.

At block 606, the first server presents the products to be displayed on a web page of the first website that is browsed by the first user.

After the second server sends the relevant information of the products to be displayed to the first server, the first server presents these selected products to be displayed. Information of the products to be displayed that is sent from the second server to the first server may vary as the way of presentation performed by the first server is different. For example, if the first server needs to present image information of the products to be displayed, the second server may send the image information of the products to be displayed to the first server at block 605. If the first server needs to present description information of the product to be displayed, the second server sends textual information of the products to be displayed to the first server at block 605.

Using the method of displaying cross-website information introduced in this embodiment, not only can displaying cross-websites information be realized as illustrated in the first and the second embodiments, but the data transmission between servers can also be reduced. This can improve rate of data transmission in a network or between servers, and save resources associated with data transmission of the servers or the network.

Figure 7:
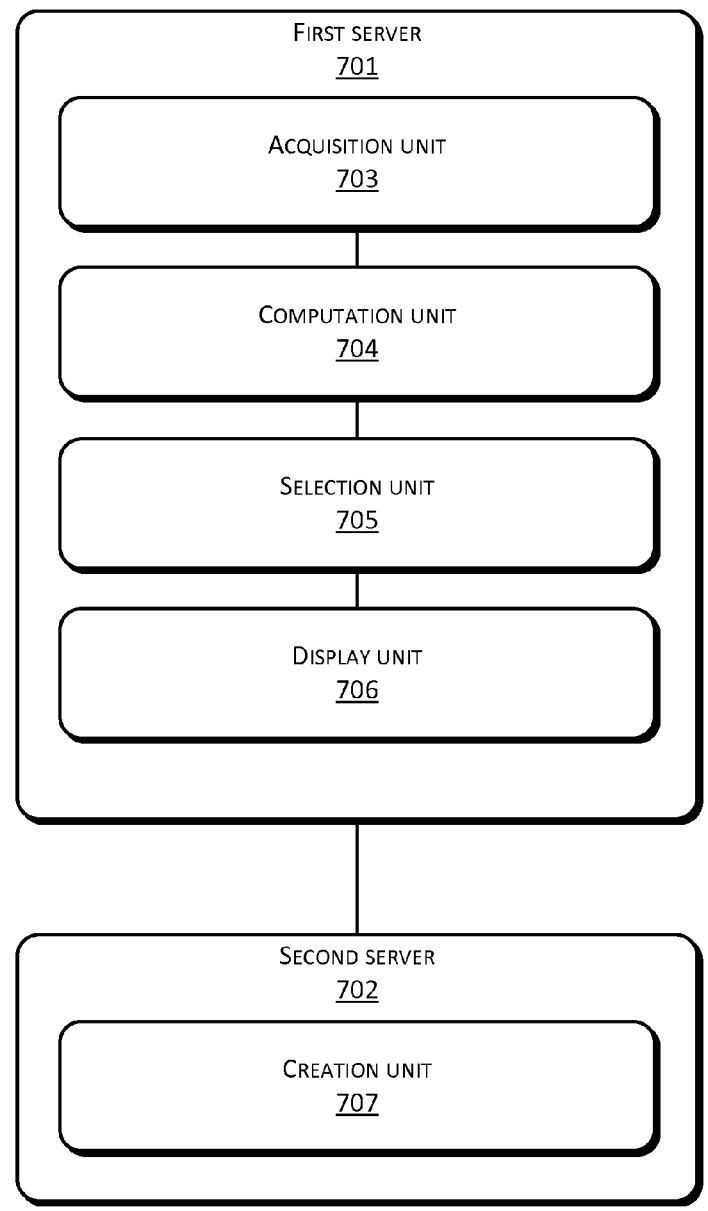
FIG. 7 shows a structural diagram illustrating a first exemplary system of displaying across-website information.

FIG. 7 shows a structural diagram of a first exemplary system of displaying cross-website information. Specifically, the system includes an acquisition unit 703, a computation unit 704, a selection unit 705 and a display unit 706 in a first server 701, and a creation unit 707 in a second server 702.

The acquisition unit 703 is configured to obtain product information under a category of at least one desired product of the first user of a first server, and information of similar product units under a product category of the second server, where a similar product unit includes a set of displayable products.

Figure 8:
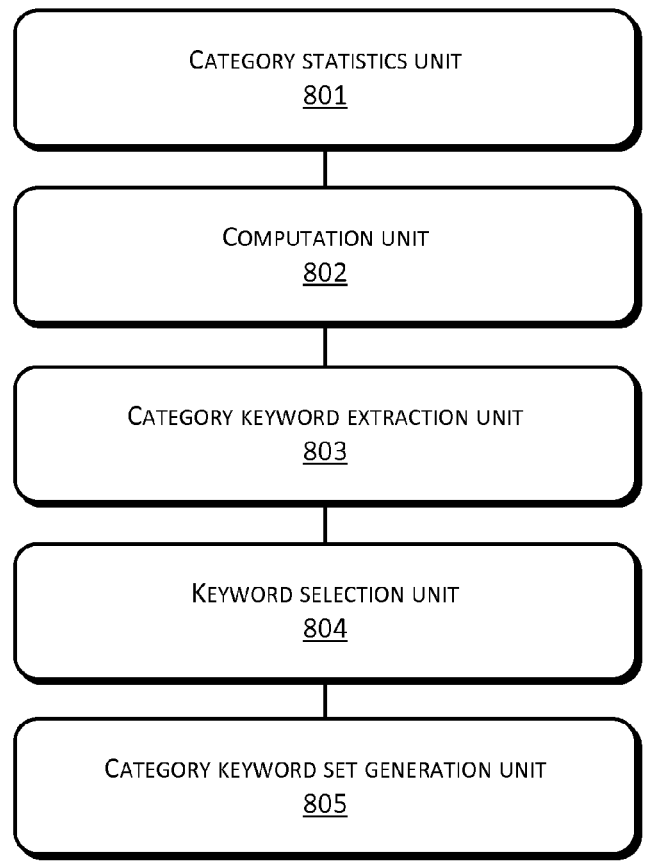
FIG. 8 shows a structural diagram illustrating an acquisition unit forming part of the first exemplary system.

As shown in FIG. 8, the acquisition unit 703 may includes a category statistics unit 801, a computation unit 802, a category keyword extraction unit 803, a keyword selection unit 804 and a category keyword set generation unit 805.

In one embodiment, the category statistics unit 801 is configured to count a product volume and a product transaction volume under each category of the first user of the first website. The computation unit 802 is configured to compute a score of each category based on the product volume and the product transaction volume, where the score is a monotonic increasing function, the product volume and the product transaction volume of each category of the first user are independent variables of the function, and the score of each category is a dependent variable, and render a predetermined number of highest-scored categories to be categories of desired products of the first user.

In some embodiments, the category keyword extraction unit 803 is configured to, for each category of the desired product, obtain a set of first product keywords of each product from the product information of respective category, where the first product keywords include product title keywords and/or product attribute keywords. Additionally, the keyword selection unit 804 is configured to select a predetermined number of top first product keywords from the set of first product keywords based on respective weights associated with the first product keywords. The category keyword set generation unit 805 is configured to use the predetermined number of top first product keywords to form a category keyword set that corresponds to respective category of the desired product.

The creation unit 707 is configured to create all similar product units under each category of the second server.

Figure 9:
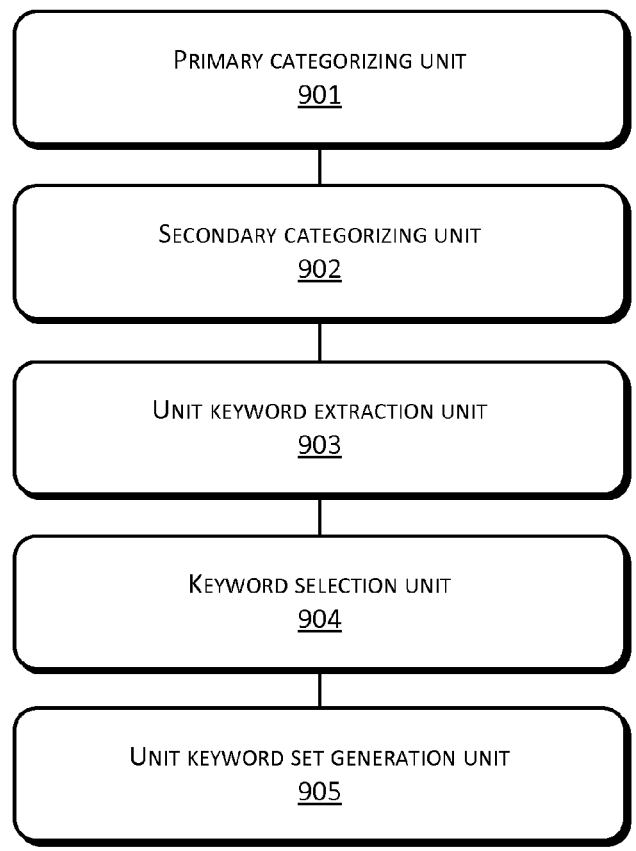
FIG. 9 shows a structural diagram illustrating a creation unit forming part of the first exemplary system.

As shown in FIG. 9, the creation unit 707 may include a primary categorizing unit 901, a secondary categorizing unit 902, a unit keyword extraction unit 903, a keyword selection unit 904, and a unit keyword set generation unit 905. The primary categorizing unit 901 is configured to categorize the displayable products of the second website based on category information. The secondary categorizing unit 902 is configured to extract product title keywords and product attribute keywords from each product under each category, and group products having same or similar product title keywords and same or similar key attribute keywords into a similar product unit, where being similar represents that a difference between key attribute values of two products is within a predetermined range. The unit keyword extraction unit 903 is configured to, for each similar product unit, extract at least one unit keyword from product information of respective similar product unit. The keyword selection unit 904 is configured to select a predetermined number of product keywords based on respective weights of the first product keywords. The unit keyword set generation unit 905 is configured to use the least one unit keyword of each similar product unit to form a respective unit keyword set, where the unit keyword set describes the product information of respective similar product unit.

The computation unit 704 is configured to compute degrees of similarity between the product information under the category of the at least one desired product and respective product information of the similar product units.

Specifically, the computation unit 704 is configured to compute a degree of similarity between a category keyword set and a unit keyword set based on a set similarity equation.

The selection unit 705 is configured to, for the product information under the category of the at least one product, select a predetermined number of top similar product units in a descending order of the degrees of similarity, and render products within the predetermined number of similar product units as products to be displayed.

The display unit 706 is configured to present the products to be displayed on a web page of the first website that is viewed by the first user.

Figure 10:
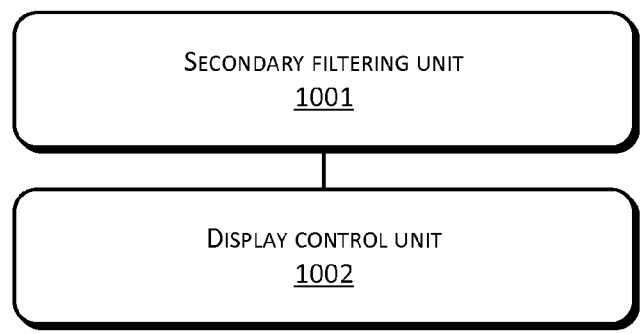
FIG. 10 shows a structural diagram illustrating a display unit forming part of the first exemplary system.

As shown in FIG. 10, the display unit 706 may include a secondary filtering unit 1001 configured to filter products that have been clicked by the first user within a predetermined time period from the products to be displayed, and a display control unit 1002 configured to select products for displaying on the web page of the first website that is viewed by the first user from filtered products to be displayed based on respective degrees of similarity of the similar product units to which the products belong, where products within a same similar product unit are randomly selected.

Figure 11:
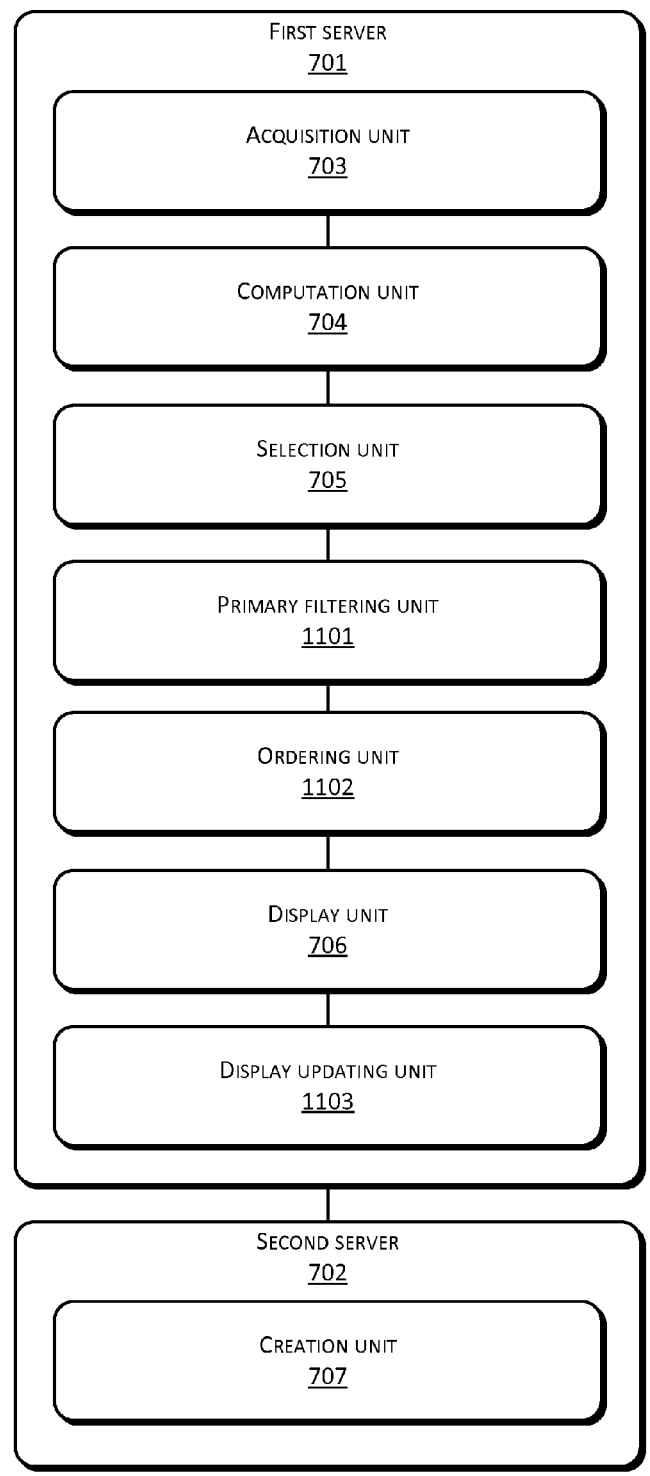
FIG. 11 shows a structural diagram illustrating a second exemplary system of displaying across-website information.

FIG. 11 shows a structural diagram of a second exemplary system of displaying cross-website information. Compared with the first embodiment, this system may further include a primary filtering unit 1101, an ordering unit 1102 and a display updating unit 1103.

The primary filtering unit 1101, which is located in the first server and coupled to the selection unit, is configured to filter products which satisfy a filtering condition from the products to be displayed, where the filtering condition includes information indicating no product image to be available, information indicating product failure and/or information indicating quality of displaying product to be below standard.

The ordering unit 1102, which is located in the first server and coupled to the primary filtering unit and the display unit, is configured to order filtered products based on a ranking factor, and render a predetermined number of top-ranked products as final products to be displayed, wherein the ranking factor includes information of degrees of similarity, information of display qualities of the products, information of click rates of the products, information of transaction complexity of the products, information of time of registration of the first user and/or information of credibility score of the first user.

The display updating unit 1103 is configured to change a predetermined number of selected products for display based on a predetermined rate of rotation, the rate of rotation corresponding to a rate of changing products to be displayed on the web page that is browsed by the first user.

Figure 12:
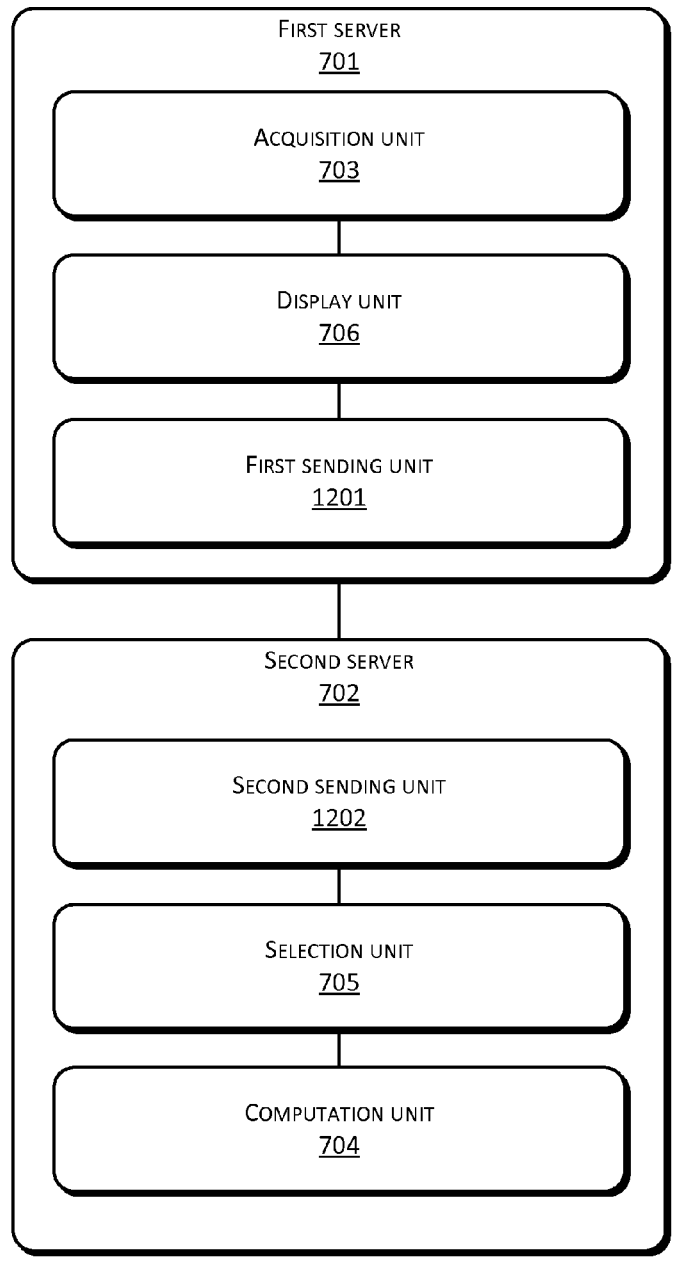
FIG. 12 shows a structural diagram illustrating a third exemplary system of displaying across-website information.

FIG. 12 shows a structural diagram of a third exemplary system of displaying cross-website information. Specifically, the system may include an acquisition unit 703, a first sending unit 1201, and a display unit 706 in a first server, and a computation unit 704, a selection unit 705 and a second sending unit 1202 in a second server.

The acquisition unit 703 is configured to obtain product information under a category of at least one desired product of a first user.

The first sending unit 1201 is configured to send the product information under the category of the at least one desired product to the computation unit.

The computation unit 704 is configured to compute degrees of similarity between the product information under the category of the at least one desired product and product information of all similar product units under each product category of the second server, where a similar product unit includes a set of displayable products.

The selection unit 705 is configured to select a predetermined number of top similar product units in a descending order of degrees of similarity, and render products within the predetermined number of similar product units as products to be displayed.

The second sending unit 1202 is configured to send products to be displayed to the display unit to facilitate the display unit to present the products to be displayed on a web page of the first website that is viewed by the first user.

It is noted that various exemplary embodiments are progressively described in this disclosure. The main points of each exemplary embodiment may be different from other exemplary embodiments, and same or similar portions of the exemplary embodiments may be referenced with one another. The descriptions of exemplary apparatuses are relatively simple as these exemplary apparatuses are similar to their counterpart embodiments of exemplary methods. Related details can be found in the embodiments of exemplary methods.

From the exemplary embodiments described above, one skilled in the art can clearly understand that the disclosed method and system may be implemented using software with essential universal hardware platform. Based on this understanding, the technical scheme of the present disclosure or existing technology may be implemented in the form of software products which are stored in a non-volatile storage media, e.g., ROM/RAM, disk, or compact disc. The software includes instructions for a computing device (e.g., a personal computer, a server or a networked device) to execute the method described in the exemplary embodiments or certain parts of the exemplary embodiments in the present disclosure.

Figure 13:
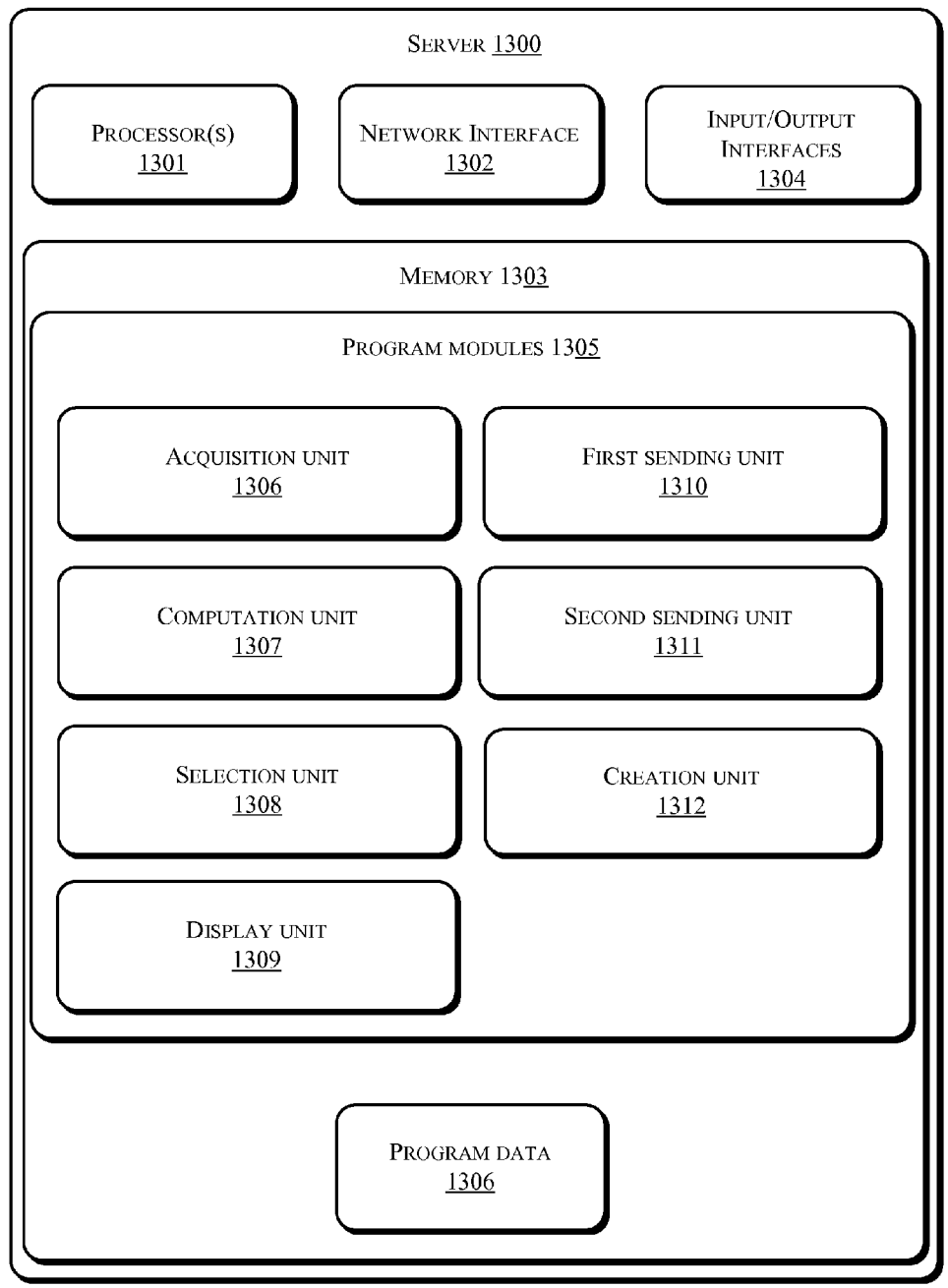
FIG. 13 shows the exemplary server described in FIGS. 7, 11 and 12 in more detail.

For example, FIG. 13 illustrates an exemplary server 1300, such as the first server and/or the second server as described above, in more detail. In one embodiment, the server 1300 can include, but is not limited to, one or more processors 1301, a network interface 1302, memory 1303, and an input/output interface 1304.

The memory 1303 may include computer-readable media in the form of volatile memory, such as random-access memory (RAM) and/or non-volatile memory, such as read only memory (ROM) or flash RAM. The memory 1303 is an example of computer-readable media.

Computer-readable media includes volatile and non-volatile, removable and non-removable media implemented in any method or technology for storage of information such as computer readable instructions, data structures, program modules, or other data. Examples of computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include transitory media such as modulated data signals and carrier waves.

The memory 1303 may include program modules 1305 and program data 1306. In one embodiment, the program units 1305 may include an acquisition unit 1306, a computation unit 1307, a selection unit 1308 and a display unit 1309. In some embodiments, the program units 1305 may further include a first sending unit 1310, a second sending unit 1311 and a creation unit 1312. In other embodiments, one or more of these units 1306-1312 may further include one or more subunits as described in the foregoing embodiments described above. Details about these program modules may be found in the foregoing embodiments described above.

Finally, it should be pointed out that any relational terms such as "first" and "second" in this document are only meant to distinguish one entity from another entity or one operation from another operation, but not necessarily request or imply existence of any real-world relationship or ordering between these entities or operations. Moreover, it is intended that terms such as "include", "have" or any other variants cover non-exclusively "comprising". Therefore, processes, methods, articles or devices which individually include a collection of features may not only be including those features, but may also include other features that are not listed, or any inherent features of these processes, methods, articles or devices. Without any further limitation, a feature defined within the phrase "include a . . . " does not exclude the possibility that process, method, article or device that recites the feature may have other equivalent features.

The above description of the disclosed method and system enables one skilled in the art to implement or apply the present disclosure. Various modifications to these exemplary embodiments are obvious to one skilled in the art. Without departing the spirits and scopes of the present disclosure, the principles described in the present disclosure can be realized in other embodiments. Therefore, the present disclosure is not construed to these embodiments described in the present disclosure, but covers the broadest scope that is consistent with the principles and novelty disclosed in this disclosure.

What is claimed is:

1. A method of displaying cross-website information, under control of one or more processors configured with executable instructions, comprising:
   obtaining, by a first server of a first website, product information under a category of at least one desired product of a user of the first website, the obtaining product information including:
       obtaining, for the category of the at least one desired product, a set of product keywords of each product within the category on the first website, the set of product keywords including at least one of product title keywords or product attribute keywords,
       weighting the keywords of the set of product keywords,
       ranking, in weighted order, the keywords of the set of product keywords from higher weighted to lower weighted,
       selecting a predetermined number of the higher weighted product keywords from the set of product keywords, and
       rendering the selected plurality of the highest weighted product keywords as a category keyword set that corresponds to the category of the at least one desired product;
   obtaining, by the first server, product information of similar product units of a second website under a product category of a second server, each of the similar product units including a set of displayable products;
   computing, by the first server, degrees of similarity between the category keyword set of the at least one desired product and respective product information of the similar product units;
   selecting, for the product information under the category of the at least one desired product, by the first server, a predetermined number of similar product units in a descending order of the degrees of similarity, and rendering products included in the predetermined number of similar product units as products to be displayed; and
   displaying, by the first server, the products to be displayed on a web page of the first website that is viewed by the user.

2. The method as recited in claim 1, wherein, prior to displaying, by the first server, the products to be displayed on the web page of the first website that is viewed by the user, the method further comprises:

filtering out, by the first server, products that satisfy a filtering condition from the products to be displayed, the filtering condition including at least one of
information indicating no product image to be available,
information indicating product failure, or
information indicating quality of displaying product to be below standard; and ordering, by the first server, the filtered products based on a ranking factor, and rendering a predetermined number of higher weighted products as final products to be displayed, the ranking factor including information of one or more of (1) degrees of similarity, (2) display qualities of the products, (3) click rates of the products, (4) transaction complexity of the products, (5) time of registration of the user or, (6) a credibility score of the user.

3. The method as recited in claim 1, wherein obtaining, by the first server of the first website, the product information under the category of the at least one desired product of a user further includes:

counting a product volume and a product transaction volume under the category of the user of the first website; and computing a score for the category based on the product volume and the product transaction volume, the score being a monotonic increasing function, the product volume and the product transaction volume of the category of the user being independent variables of the function and the score for the category being a dependent variable, and rendering a predetermined number of highest-scored categories to be categories to which the desired product of the user belongs.

4. The method as recited in claim 3, wherein the similar product units are created by the second server, wherein the set of product keywords is a first set of product keywords, and wherein the method further comprises:

categorizing, by the second server, displayable products of the second website based on category information;

extracting a second set of product keywords from respective products under respective categories, the second set of product keywords including product title keywords and product attribute keywords;

grouping products having same or similar product title keywords and same or similar product attribute keywords into a similar product unit, where similar keywords include keywords for which a difference between key attribute values of two products is within a predetermined range;

weighting the keywords of the second set of product keywords;

ranking, in weighted order, the keywords of the second set of product keywords from higher weighted to lower weighted;

selecting, from among the second set of product keywords related to the similar product unit, a predetermined number of the higher weighted second product keywords; and rendering the predetermined number of the higher weighted second product keywords as a unit keyword set that corresponds to the similar product unit.

5. The method as recited in claim 4, wherein the computing, by the first server, the degrees of similarity includes:

computing a degree of similarity between the category keyword set and the unit keyword set based on a set similarity equation.

6. The method as recited in claim 1, wherein the displaying, by the first server, the products to be displayed includes:

filtering out products that have been clicked by the user within a predetermined time period from the products to be displayed; and selecting, from filtered products, products for displaying on the web page of the first website that is viewed by the user based on degrees of similarity respective similar product units to which the products belong, products in a same similar product unit being randomly selected.

7. The method as recited in claim 6, further comprising:

changing a predetermined number of selected products to be displayed based on a predetermined rate of rotation, the rate of rotation being a rate of changing products to be displayed on the web page that is viewed by the user.

8. A method of displaying cross-website information, under control of one or more processors configured with executable instructions, comprising:

obtaining, by a first server of a first website, product information under a category of at least one desired product of a user of the first website, the obtaining product information including:

obtaining, for the category of the at least one desired product, a set of product keywords of each product within the category on the first website, the set of product keywords including at least one of product title keywords or product attribute keywords, weighting the keywords of the set of product keywords, ranking, in weighted order, the keywords of the set of product keywords from higher weighted to lower weighted, selecting a predetermined number of the higher weighted product keywords from the set of product keywords, and rendering the selected plurality of the highest weighted product keywords as a category keyword set that corresponds to the category of the at least one desired product;

sending the product information under the category of the at least one desired product to a second server; and receiving, by the first server, products of a second website to be displayed sent from the second server to facilitate displaying the products to be displayed on a web page of the first website that is viewed by the user.

9. The method as recited in claim 8, further comprising:

computing, by the second server, degrees of similarity between the product information under the category of the at least one desired product and respective product information of all similar product units of the second website under each product category, respective similar product units including a set of displayable products; and selecting, for the product information under the category of the at least one desired product by the second server, a predetermined number of higher weighted similar product units in a descending order of the degrees of similarity, and rendering products included in the predetermined number of higher weighted similar product units as the products to be displayed.

10. A system of cross-website information display, comprising:

a processor;
memory;

an acquisition unit stored in the memory and executable via the processor to obtain product information under a category of at least one desired product of the user of a first server of a first website, and information of similar product units of a second website under product categories of a second server of the second website, respective similar product units including a set of displayable products, and the acquisition unit including a category keyword extraction sub-unit configured to, for each category of the at least one desired product, obtain a set of product keywords of each product from the product information of each respective category, the respective sets of product keywords including at least one of product title keywords or product attribute keywords, a weighting sub-unit configured to assign a weighted value to respective product keywords, a ranking sub-unit configured to rank, in weighted order, the keywords of the sets of product keywords from higher weighted to lower weighted, a keyword selection sub-unit configured to select a predetermined number of the higher weighted product keywords from the respective sets of product keywords, and a category keyword set generation sub-unit configured to use the predetermined number of higher weighted product keywords to form a category keyword set that corresponds to the respective category of the at least one desired product;

a creation unit stored in the memory and executable via the processor to create the similar product units under each product category of the second server;

a computation unit stored in the memory and executable via the processor to compute degrees of similarity between the product information under the category of the at least one desired product and respective product information of the similar product units;

a selection unit stored in the memory and executable via the processor to select, for the product information under the category of the at least one desired product, a predetermined number of higher weighted similar product units in a descending order of the degrees of similarity, and render products included in the predetermined number of higher weighted similar product units as products to be displayed; and a display unit stored in the memory and executable via the processor to cause the products to be displayed on a web page of the first website that is viewed by the user.

11. The system as recited in claim 10, further comprising:
a primary filtering unit, which is located in the first server and coupled to the selection unit, configured to filter out products which satisfy a filtering condition from the products to be displayed, the filtering condition including information indicating no product image to be available, information indicating product failure, or information indicating quality of displaying product to be below standard; and an ordering unit, which is located in the first server and coupled to the primary filtering unit and the display unit, configured to order filtered products based on a ranking factor, and to render a predetermined number of higher weighted products as final products to be displayed, wherein the ranking factor includes one or more information of (1) degrees of similarity, (2) display qualities of the products, (3) click rates of the products, (4) transaction complexity of the products, (5) time of registration of the user, or, (6) credibility score of the user.

12. The system as recited in claim 10, wherein the acquisition unit comprises:

a category statistics sub-unit configured to count a product volume and a product transaction volume under each category of the user of the first website; and a computation sub-unit configured to compute a score of each category based on the product volume and the product transaction volume, wherein the score is a monotonic increasing function, the product volume and the product transaction volume of each category of the user are independent variables of the function, and the score of each category is a dependent variable, and render a predetermined number of highest-scored categories to be categories of desired products of the user.

13. The system as recited in claim 12, wherein the creation unit comprises:

a primary categorizing unit configured to categorize the displayable products of the second website based on category information;

a secondary categorizing unit configured to extract product title keywords and product attribute keywords from each product under each category, and group products having same or similar product title keywords and same or similar key attribute keywords into a similar product unit, where similar keywords include keywords for which a difference between key attribute values of two products is within a predetermined range;

a unit keyword extraction unit configured to, for each similar product unit, extract at least one unit keyword from product information of respective similar product unit; and a unit keyword set generation unit configured to use the least one unit keyword of each similar product unit to form a respective unit keyword set, wherein the unit keyword set describes the product information of respective similar product unit.

14. The system as recited in claim 13, wherein the computation unit is configured to compute a degree of similarity between a category keyword set and a unit keyword set based on a set similarity equation.

15. The system as recited in claim 10, wherein the display unit comprises:

a secondary filtering unit configured to filter out products, which have been clicked by the user within a predetermined time period, from the products to be displayed; and a display control unit configured to select products for displaying on the web page of the first website that is viewed by the user from filtered products to be displayed based on respective degrees of similarity of the similar product units to which the products belong, wherein products within a same similar product unit are randomly selected.

16. The system as recited in claim 15, wherein said display unit further comprises:

a display updating unit configured to change a predetermined number of selected products for display based on a predetermined rate of rotation, the rate of rotation corresponding to a rate of changing products to be displayed on the web page that is browsed by the user.

17. A system of cross-website information display, comprising:
a processor;
memory;

an acquisition unit stored in the memory and executable via the processor to obtain product information under a category of at least one desired product of a user of a first server associated with a first website, the acquisition unit including
- a category keyword extraction sub-unit configured to, for the category of the at least one desired product, obtain a set of product keywords within the category on the first website, the set of product keywords including at least one of product title keywords or product attribute keywords,
- a weighting sub-unit configured to assign a weighted value to respective product keywords,
- a ranking sub-unit configured to rank, in weighted order, the keywords of the set of product keywords from higher weighted to lower weighted,
- a keyword selection sub-unit configured to select a predetermined number of the higher weighted product keywords from the set of product keywords, and
- a category keyword set generation sub-unit configured to use the predetermined number of higher weighted product keywords to form a category keyword set that corresponds to the category of the at least one desired product;

a sending unit stored in the memory and executable via the processor to send the product information under the category of the at least one desired product to a second server, the second server being associated with a second website that is different from the first website; and a display unit stored in the memory and executable via the processor to receive information of products to be displayed from the second server and displays the products to be displayed on a web page of the first website that is viewed by the user.

18. The system as recited in claim 17, wherein the sending unit is a first sending unit, and wherein the second server comprises:
- a computation unit configured to compute degrees of similarity between the product information under the category of the at least one desired product and respective product information of all similar product units under each product category of the second server, similar product units including a set of displayable products;
- a selection unit configured to, for the product information under the category of the at least one desired product, select a predetermined number of higher weighted similar product units in a descending order of the degrees of similarity, and rendering products included in the predetermined number of higher weighted similar product units as the products to be displayed; and
- a second sending unit configured to send the products to be displayed to the display unit to facilitate the display unit to display the products to be displayed on the web page of the first website that is viewed by the user.

19. The system as recited in claim 17, further comprising:

a primary filtering unit stored in the memory and executable via the processor that filters out products which satisfy a filtering condition from the products to be displayed, wherein the filtering condition includes at least one of
- information indicating no product image to be available,
- information indicating product failure, or
- information indicating quality of displaying product to be below standard.

20. The system as recited in claim 19, further comprising:

an ordering unit stored in the memory and executable via the processor that orders
- the filtered products based on a ranking factor, and
- renders a predetermined number of higher weighted products as final products to be displayed, wherein the ranking factor includes information of degrees of similarity, information of display qualities of the products, information of click rates of the products, information of transaction complexity of the products, information of time of registration of the user, or information of credibility score of the user.

* * * * *